April 25, 1967        C. J. MAYO ET AL        3,316,362
HEATED TROLLEY ELECTRIFICATION SYSTEMS
Filed Oct. 14, 1963        6 Sheets-Sheet 1

INVENTORS.
CECIL J. MAYO
JAMES A. CORL
RONALD J. KILBURG
BY
Fowler, Knobbe & Gambrell
ATTORNEYS.

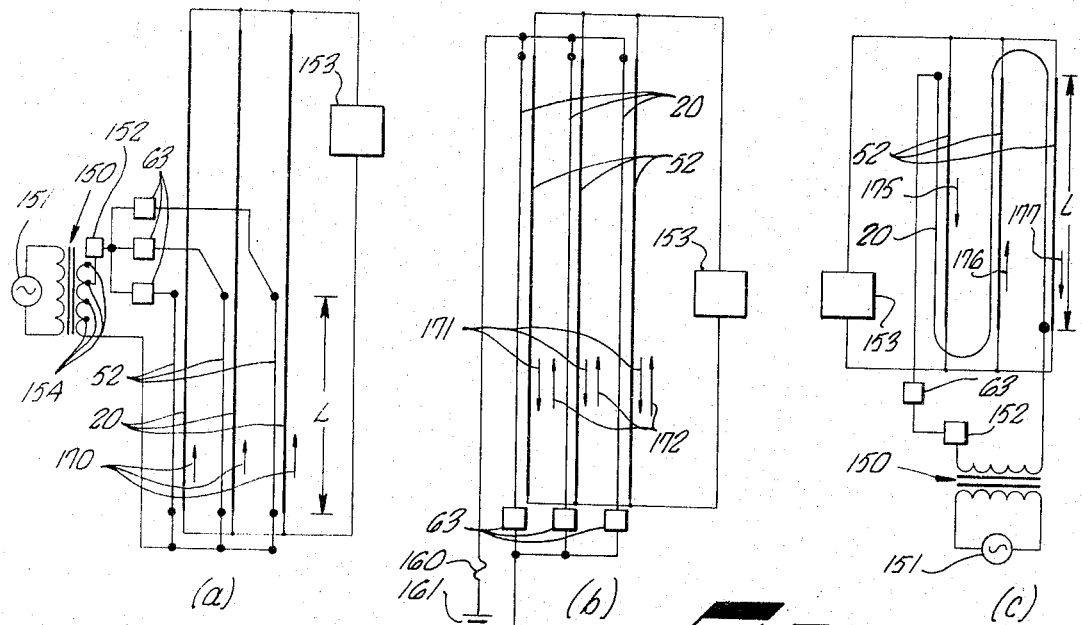
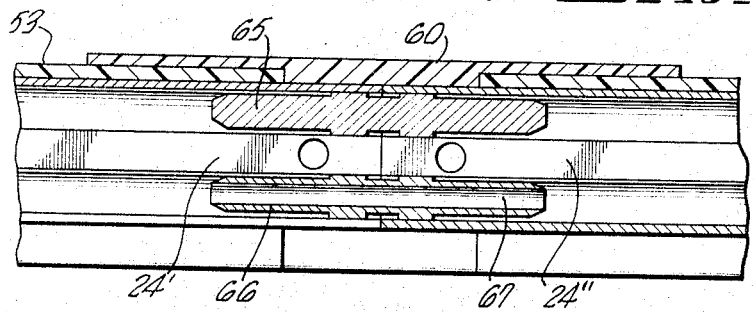
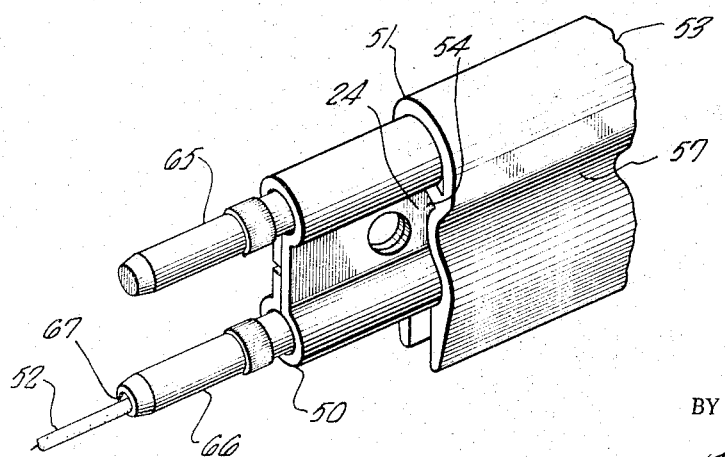

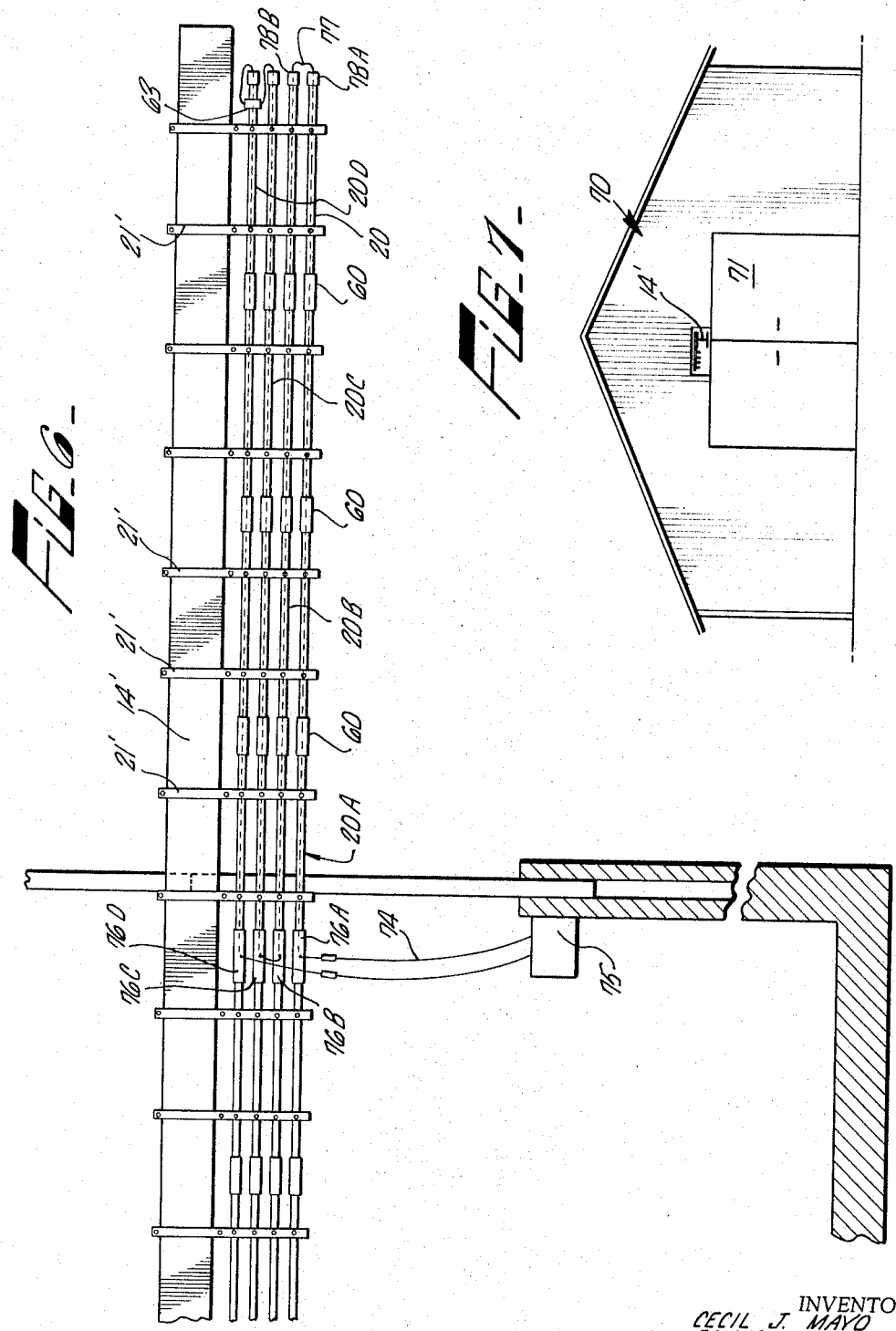

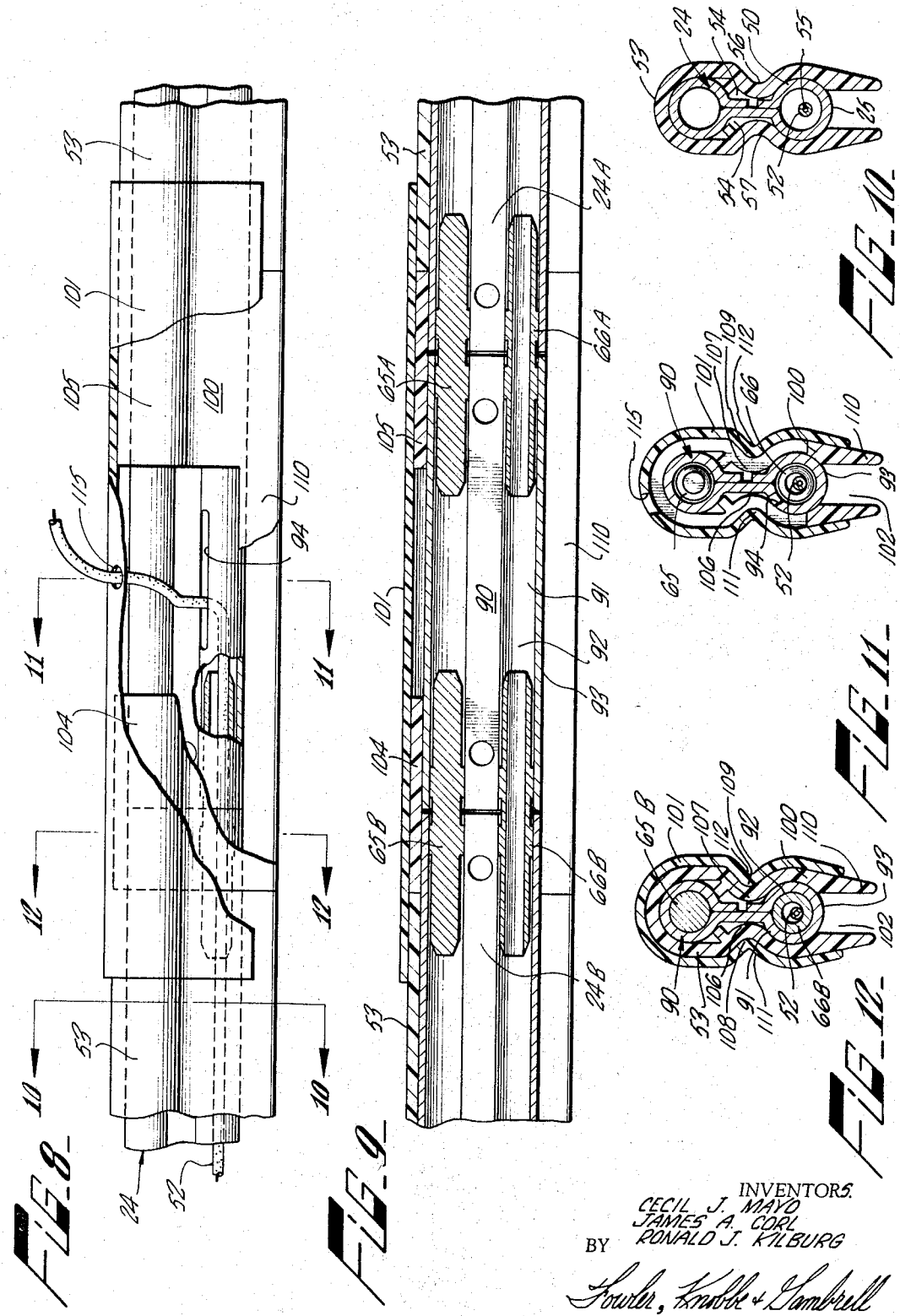

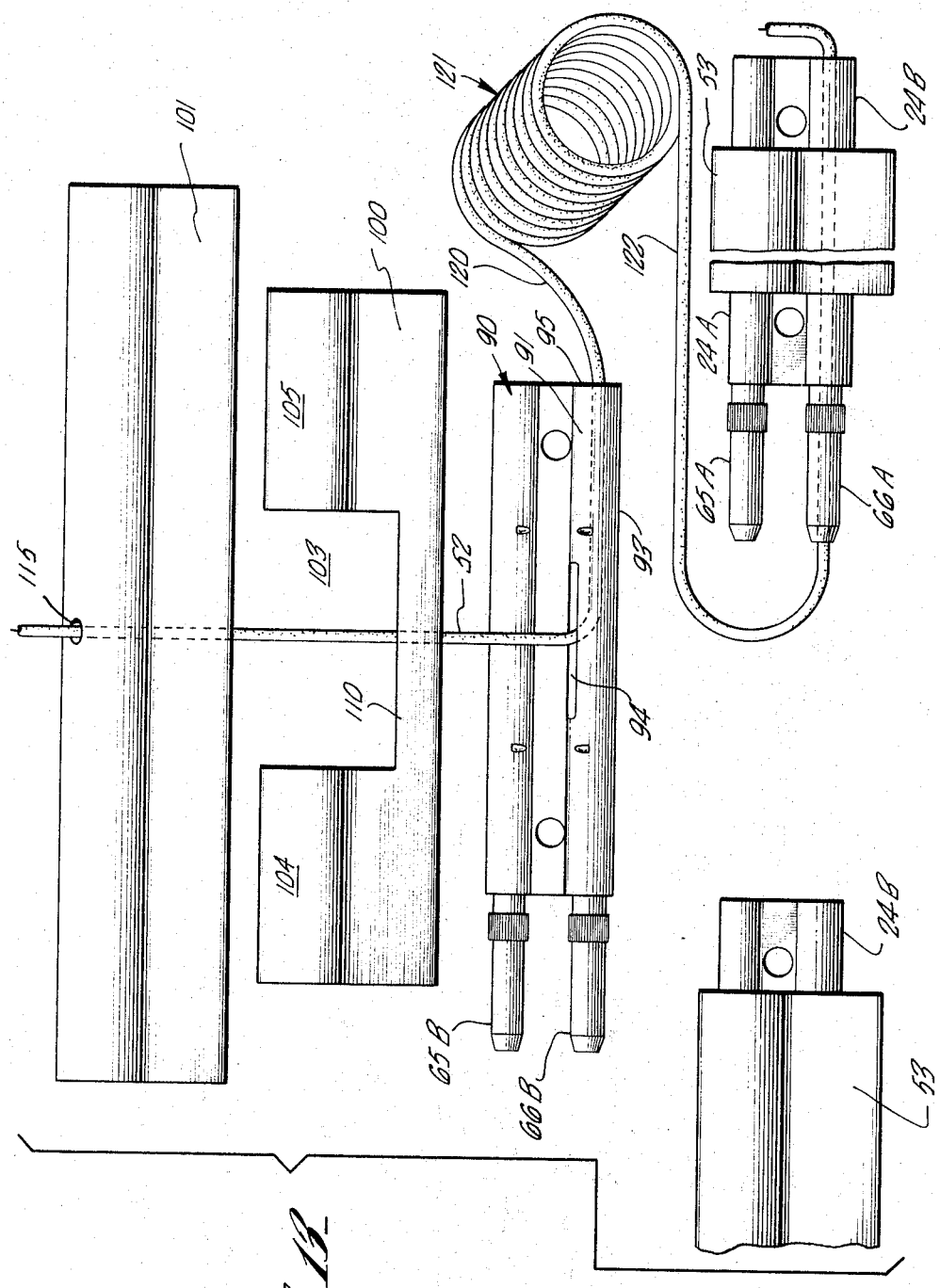

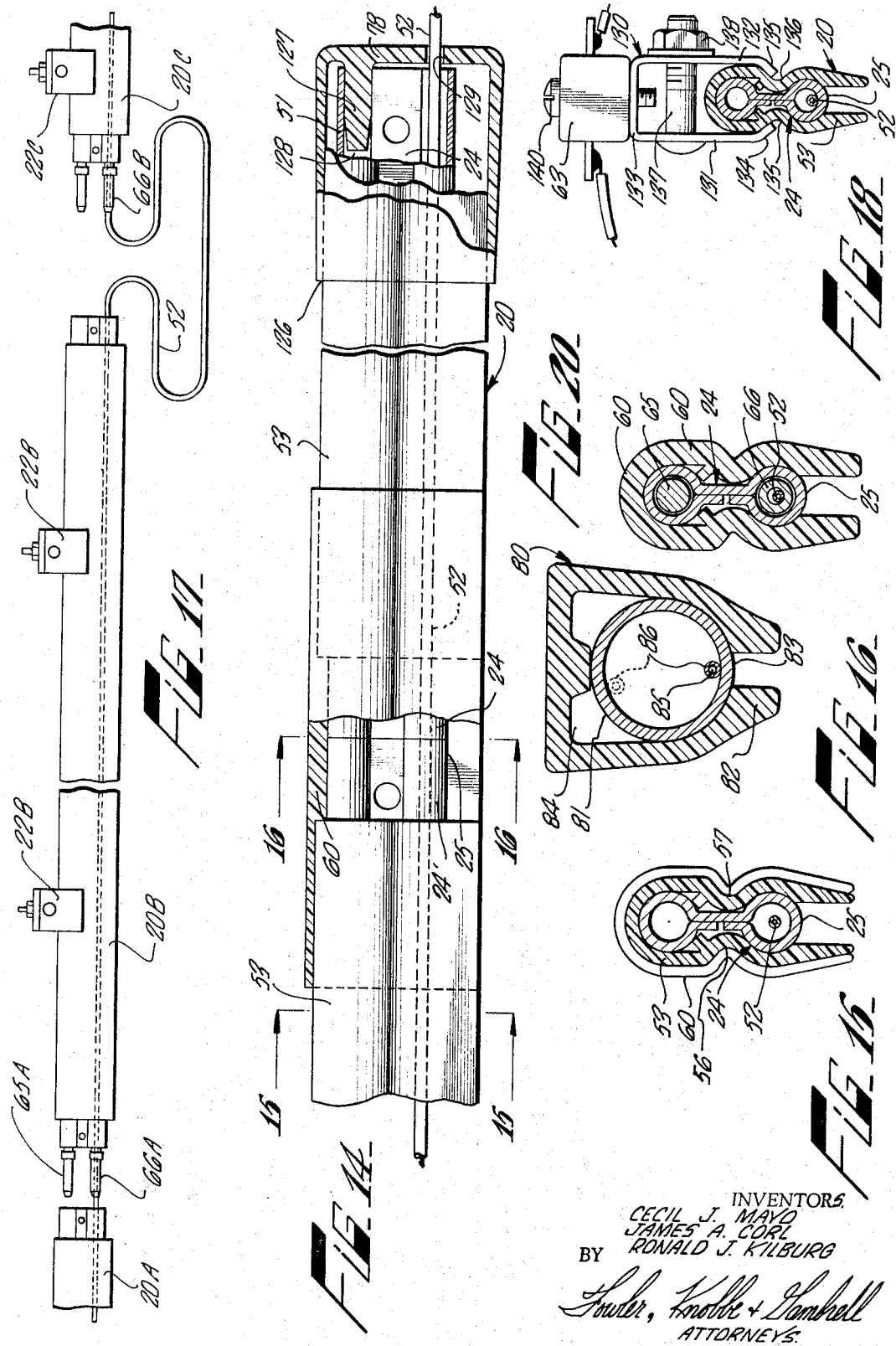

United States Patent Office 3,316,362
Patented Apr. 25, 1967

3,316,362
HEATED TROLLEY ELECTRIFICATION SYSTEMS
Cecil J. Mayo, Hillsborough, and James A. Corl and Ronald J. Kilburg, San Carlos, Calif., assignors to Insul-8 Corp.
Filed Oct. 14, 1963, Ser. No. 315,761
15 Claims. (Cl. 191—27)

The present invention relates to improvements in heated trolley electrification systems, i.e., systems incorporating a heated bus bar for inhibiting the formation and retention of frozen moisture thereon.

Trolley electrification systems are widely employed for supplying electrical power to mobile machinery, for example, to an electrical hoist mounted on a carriage suspended on wheels which roll along a supporting rail. In a representative system, one or more conductor bus bar assemblies are supported from and extend along the rail and a corresponding number of electrical collectors are mounted on the carriage and held in engagement with exposed surfaces of the bus bars as the carriage moves along the rail.

A particular problem encountered in colder climes is that ice, sleet, snow and frost are formed on and retained on the exposed portion of the conductor bar. This frozen moisture obstructs the smooth passage of the movable collector, often resulting in the collector being physically displaced from the conductor bar. Moreover, the collector may even be frozen fast to the conductor bus bar. Further, the frozen moisture provides a very high resistance path for the passage of electrical current, resulting in a substantial disruption of electrical power to the mobile machinery.

An exemplary electrical bus bar heater system is taught and claimed in the copending application of Alfred J. Luberts, Ser. No. 316,058, which was filed on October 14, 1963, and assigned to Insul-8 Corp., assignee of the present invention. In this application is described a bus bar system having a conductive member of which an external elongated portion serves as the contact surface for the movable electrical collector. An insulated resistance heater wire mounted in the interior of this bus bar assembly parallel the elongated contact surface is connected to a suitable electrical power source for heating the exposed contact surface. A substantial portion of the exterior surface of the bus bar is covered by a sheath formed of a low heat conductive material. This sheath serves the dual purposes of covering substantially all of the bus bar except the contact surface with an electrically insulating sheath and of retaining the heat energy supplied by the electrical heater wire. The heat supplied from the heater wire in combination with the heat retaining insulating cover has been found to maintain the exposed contact surface free of ice and snow under quite severe weather conditions.

In many applications involving this heated bus bar, it is advantageous to introduce the heater wire at a point remote from the ends of an elongated bus bar assembly. For example, the supporting rail is often mounted so as to extend from inside a building to the outside thereof so that mobile machinery may be transported from within the building to a location remote therefrom. Usually in such an installation, frost and other frozen moisture is only a problem for that portion of the bus bar associated with the outdoor rail. Accordingly, it is wasteful of both heater wire and electrical power to provide heated bus bar within the building proper.

A feature of the present invention is a heater wire entrance member which may be mounted intermediate the ends of an elongated bus bar assembly while maintaining a continuous contact surface and a continuous insulating sheath between the bus bar sections.

Another problem successfully solved by the present invention is that of economically joining successive sections of heated bus bar to maintain sufficient current carrying capacity and mechanical rigidity while providing a continuous cavity through which the electrical resistance heater wire may extend through successive sections without break or splice.

Additional features of this invention are a novel end cap through which the heater wire may extend, a novel member for supporting the thermostat in the environment of the bus bar assembly, and several advantageous methods and modes for assembling heated trolley electrification systems.

Other and further objects, features and advantages of the invention will become apparent from the following detailed description taken in connection with the accompanying drawings in which:

FIG. 4 is a cross-sectional view illustrating a heated bus bar joint assembly constructed in accordance with this invention;

FIG. 5 is a perspective view of the end portion of a heated bus bar assembly constructed in accordance with the present invention;

FIG. 6 is a plan view of a typical installation of heated bus bar extending within and without a closed structure;

FIG. 7 is an elevation view of a typical building having an aerially supported rail and heated bus bar assembly;

FIG. 8 is an elevation view of an entrance assembly constructed in accordance with the present invention with portions cut away to illustrate the details thereof;

FIG. 9 is a sectional view of the entrance assembly of FIG. 8;

FIGS. 10, 11 and 12 are sectional views respectively taken along lines 10—10, 11—11 and 12—12 of FIG. 8;

FIG. 13 illustrates the several component parts of the entrance assembly of FIG. 8 and a preferred method for installing same in a heated trolley electrification system;

FIG. 14 is an enlarged elevation view of a portion of heated bus bar assembly constructed in accordance with this invention with portions cut away to expose a joint assembly and an end cap assembly;

FIGS. 15 and 16 are sectional views respectively taken along lines 15—15 and 16—16 of FIG. 14;

FIG. 17 illustrates the assembly of a heated trolley electrification system comprising plural bus bar sections;

FIG. 18 illustrates a preferred means for mounting a thermostat in the environment of the bus bar assembly;

FIGS. 19a, 19b and 19c schematically illustrate serially and parallel connected heated bus bar systems and means for isolating the heater power supply from the resistance heater wire; and FIG. 20 is a cross-sectional view of an alternative bus bar assembly.

*Overall description of trolley electrification system*

Figure 1:
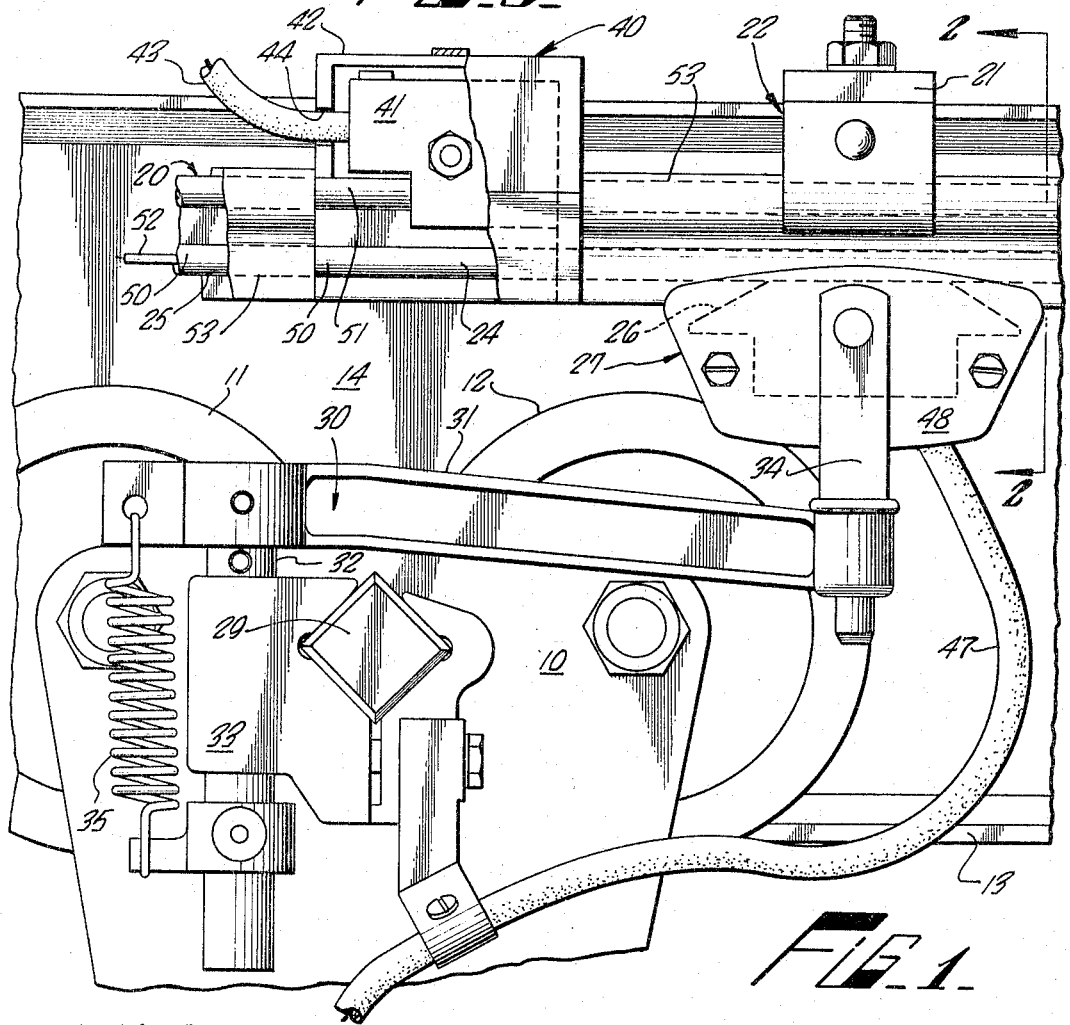
FIG. 1 is a fragmentary elevation view of a rail mounted carriage with a heated bus bar assembly mounted along the rail and a corresponding collector assembly mounted on the carriage.

Referring now to FIG. 1, a mobile machine comprises a carriage 10 suspended on wheels 11, 12 which roll along the lower flange 13 of a supporting rail 14. The carriage 10 may carry an electrically powered hoist or other equipment (not shown).

Figure 2:
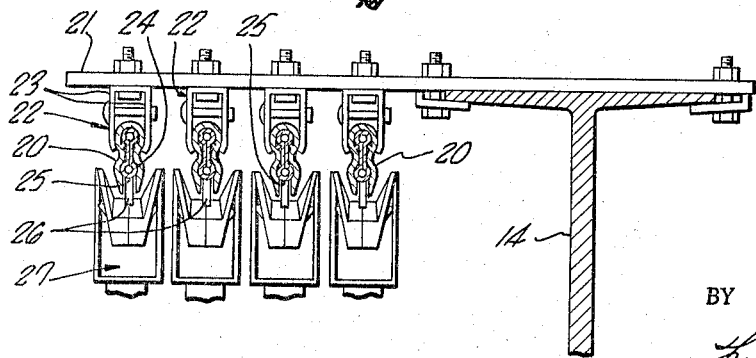
FIG. 2 is an end elevation taken generally along line 2—2 of FIG. 1 showing a plurality of parallel mounted conductor bars and their associated collector assemblies.

A trolley electrification system includes one or more electrically conductive bus bar assemblies 20 fixedly supported parallel to the rail 14 by a cantilever hanger bracket 21 fixed to the top surface of the rail 14 (FIG. 2). A sufficient number of hanger clamps 22 depend from the bracket 21 to suspend each bus bar assembly. As shown, each clamp includes depending side walls 23 which grip the side walls of the bus bar. Each bus bar assembly includes a longitudinally extending, electrically conductive bus bar 24 having an exposed surface 25 engaged by a conductive shoe or brush 26 mounted in a collector head 27 included in a collector assembly 30.

A representative collector assembly 30 is shown in FIG. 1 supported on a square cantilever mounting beam 29 which extends rigidly from the carriage 10. For convenience, only one such collector assembly is shown in this figure, although it will be apparent that several such assemblies may be supported upon common beam 29 in side-by-side relationship. The collector assembly includes an arm 31 pivoted to an arm support post 32. This post is mounted by a collector support bracket 33. The other end of arm 31 is pivotally connected to and mounts a collector head support yoke 34. A constant upward bias is applied to yoke 34 by a coil spring 35 connected between the opposite end of arm 31 and the support post 32.

The collector head 27 includes a pair of identical opposed cheeks or side walls 48 formed of an electrically insulating material; the conductive shoe 26; and a cable 47 for making electrical connection to the collector brush 26. The cheeks 48 guide the collector head along the opposite surfaces of the bus bar assemblies 20 so that electrical contact is made between the exposed contact surface 25 of the bus bar and the shoe or brush 26.

A power feed member 40 provides means for supplying electrical energy to the bus bar 24. This member advantageously comprises a conductive clamp 41 fixedly attached to the bus bar 24 and an electrically insulating case 42 enclosing the clamp 41. A cable 43 attached to the clamp 41 extends through an aperture 44 of case 42 to an external power source.

*Description of heated bus bar assembly*

Heated bus bar assemblies constructed in accordance with the copending application of Alfred J. Luberts, identified supra, comprise, as shown in FIGS. 1, 2, 10 and 15, a bus bar 24 of composite cross-section, an insulated resistance heater wire 52 and a sheath 53. Bus bar 24 includes a first conductor portion 50 adjacent the exposed contact surface 25 and a second conductive portion 51 remote from this contact surface. The portion 50 adjacent the exposed contact surface preferably comprises a hollow, substantially closed lobe having a relatively thin metal wall with an exterior portion of the wall serving as the exposed contact surface 25.

The electrical resistance heater wire 52 is covered with a uniform outside insulation cover 55 of smaller outside dimension than the inside dimension of the lobe 50 so that the heater wire may be extended within this hollow lobe 50.

A substantially rigid electrically insulating sheath 53 of low heat conductivity covers all of the bus bar except for a gap which extends along the length of the conductive lobe 50 and exposes the surface 25. The inner faces of the opposite side walls of the insulating sheath extend inwardly to generally follow the external contour of the bus bar 24 and to provide elongated grooves 56, 57 in each of the exterior faces of the side walls. As a result, the insulating sheath engages the exterior of the conductive bus bar in intimate contact along opposite sides of the contact surface 25 with, however, substantial interior portions thereof spaced away from the conductive bar to define interior air pockets 54 between the sheath and the bus bar (FIGS. 5, 10).

Heated bus bar assemblies constructed in the manner of Alfred J. Luberts, supra, have been found to be very effective in inhibiting the formation and retention of moisture during even severe conditions of snow and sleet. Apparently, the low heat conductivity sheath 53 with the help of the insulating air pockets 54 contain the heat energy generated by the resistance heater wire 52 and substantially inhibits its dissipation by radiation, convection and conduction. A particular feature of the assembly shown is that lobe 50 physically confines the heater wire in a position proximate the inside wall of the contact surface, thereby insuring very efficient utilization of the heat energy derived from the resistance heater and uniform heat properties along the length of bus bar.

An alternative heated bus bar assembly 80, also described and claimed in the Alfred J. Luberts application, is shown in FIG. 20. This assembly comprises an elongated thin wall conductive tube or cylinder 81 serving as the bus bar member and a sheath 82 substantially covering tube 81 but leaving an exposed contact surface 83 and forming interior air pockets 84 between the sheath and the bus bar. Electrical resistance heater wire 85 having an outside insulation covering 86 extends within the tubing 81. The inside diameter of tube 81 is usually large with respect to the heater wire insulation diameter in order to obtain efficient current carrying capacity and sufficient mechanical rigidity in the bus bar member 81.

The configuration of FIG. 20 embodies some of the useful features of the Luberts' invention. Thus, the sheath contains the heat energy produced by the heater wire 85 as described above. Further, the heater wire 85 will normally be retained proximate the exposed contact surface. However, this wire is sometimes relatively stiff and when inserted as shown inside the relatively large tube 81 may, at points, reside in the upper portion of the bus bar tube 81 as shown by the dotted lines. Gravity, therefore, may not always be effective to retain the heater wire proximate the inside wall of the exposed contact surface and hence the heat characteristics of this embodiment will be less dependable than the embodiment of FIGS. 2, 10 and 15 wherein the lower, smaller and substantially closed lobe 50 physically confines the heater wire to a position more closely adjacent the exposed contact surface 25. This is true since for a given conductor bar capacity, the double lobe configuration permits the necessary metal to be provided around two cavities instead of around only one cavity.

Figure 3:
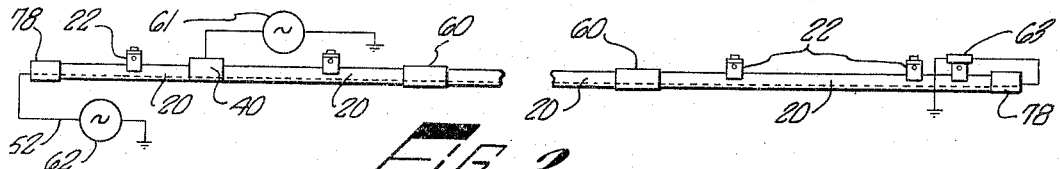
FIG. 3 illustrates an elongated heated bus bar assembly formed by a plurality of successive bus bar sections and independent means for supplying electrical power to the bus bar and to the bus bar heater system.

As shown in FIG. 3, each complete length of heated bus bar assembly ordinarily includes a plurality of successive bus bar assembly sections 20 whose juxtaposed ends are joined and covered with an insulating sheath joint cover member 60. Electrical power is supplied to the heated bus bar as shown wherein a first power source 61 is connected to the power feed member 40 for energizing the movable collector assembly in engagement therewith. In addition, a second source of power 62 is connected to the heater wire 52 in series with a thermostat 63. This thermostat is exposed to the environment of the bus bar assembly and is preset to a value such that when the temperature of the bus bar assembly reaches a sufficiently low value, power is supplied the heater wire 52 for heating same and preventing formation and retention of frozen moisture upon the exposed bus bar surface.

By way of illustration only, the following specific example is given as a typical heated trolley electrification system.

The bus bar conductor is formed of copper or steel and has cross-sectional dimensions of 1 x ⅜-inch and a standard length of 10 feet. A steel bar having these dimensions and the cross-sectional configuration of FIGS. 2, 5, 10, 15 is rated for 90 amperes, 600 volts A.C., 250 volts D.C. continuous service and a copper bar of like dimensions and configuration is rated for 300 amperes, 600 volts A.C., 250 volts D.C. continuous service. The inside diameter of the lobe 50 is ¼-inch and the outside diameter of the heater wire is ³⁄₃₂ to ⅛-inch. The sheath 53 is formed of polyvinylchloride plastic having the thermal conductivity of about .0004 (defining calories per second through a plate one centimeter across an area of one square centimeter when the temperature difference is 1° C.). The contained air pockets 54 have a thermal conductivity of about 0.00005. By way of comparison, steel has a thermal conductivity of 0.113 and copper a conductivity of 1.00. Suitable resistance wire known in the trade as radiant heating cable and having a uniform nylon insulation is sold by Everwarm, Inc. of Knoxville, Tenn., as number E–25456–90° C. Power is supplied to this heater wire to dissipate on the order of 5 watts per foot. An 80-foot run of heater wire (through 8 standard bus bar sections) has, for example, a total resistance of 35 ohms and will dissipate a total of 341 watts or 4.25 watts per foot when connected to 110 volts A.C. The thermostat is preset to continuously energize the resistance heater when the environmental temperature is reduced to around 35° F. In actual tests of the system, the temperature of the exposed contact surface 25 has been found to increase at least 20° F. about the ambient temperature. This temperature differential has been found to be adequate to maintain the electrification system free of ice and frozen moisture for practically all weather conditions, since very low environmental temperatures, e.g. below 15° F., are ordinarily associated with low humidity.

Joint assembly

An advantage of the present invention is that a plurality of heated bus bar sections may be assembled very economically to form an elongated bus bar assembly. At one end of each bus bar 24 are located connector pins 65, 66 (FIGS. 4 and 5) formed of a conductive material and preferably copper. These pins engage juxtaposed ends of adjacent bus bar sections 24' and 24'' and serve to electrically and mechanically join the respective sections in a given trolley electrification system. One pin, e.g., the upper pin 65 associated with bus bar portion 51 is of solid construction for maximum current conduction and the other pin, e.g., the lower pin 66 associated with the bus bar lobe 50, includes a longitudinally extending aperture 67 through which the insulated heater wire 52 may extend into the succeeding section. The respective ends of juxtaposed bus bar sections are joined by forcing connector pins 65, 66 into respective cavities of the adjoining bus bar section until the juxtaposed bus bar ends abut each other (FIGS. 4, 14 and 16). The exposed end portions of the conductor bars 24'', 24' are covered by the joint insulating sheath 60 so that the only exposed metal surface is the contact surface 25.

This connector system obviates any type of connector terminals for the heater wire between successive sections of bus bar. Connector terminals would increase the expense of the system and would introduce a possible source of voltage drop in the heater system. Moreover, the time required to assemble a heated trolley electrification system would be materially increased.

The hollow connector pin in combination with the solid connector pin thus provides a very satisfactory solution to the problem of joining successive bus bar sections while providing a continuous cavity therethrough so that a continuous uniform heater wire 52 may extend the entire length of the bus bar system, as shown in FIG. 3. Although a continuous cavity will be provided if the hollow connector pin 66 is deleted altogether, the resulting decrease in conductor area between the bus bar joints can result in an excessive current loss and heating at the joint because of the substantial currents handled by the bus bars 24. Further, the dual pins 65, 66 maintain physical alignment of the contact surfaces 25 of adjacent conductor bars. Contrariwise, if pin 66 is deleted, the bars can pivot or rotate with respect to one another. Such rotation will produce a shearing action which can cut the heater wire or damage its insulation covering so as to cause a short in the heater system. Also, pivotal movement of the bars with respect to one another causes a discontinuity in the exposed contact surface so that the collector may strike the sheath cover or become disengaged entirely from the bus bar assembly.

Typical application of heated bus bar assembly extending within and without closed structure FIGS. 6 and 7 illustrate a typical application of the heated bus bar wherein said bar extends both inside and outside of a substantially closed structure. As shown, a rail 14' is aerially supported to run both within and without a building 70. Rail 14' in turn supports a plurality of electrically conductive bus bar assemblies 20A, 20B, 20C and 20D fixedly supported parallel to the rail 14'. In this manner, the mobile machinery may be transported from within the building 70 through the building doors 71 to the outside of the building proper. In this type of installation, it is usually unnecessary to protect the conductor bar assemblies mounted within the building against the formation of frozen moisture. It is therefore unnecessary to include an electrical resistance heating element along the entire length of conductor bar. Instead, as shown in FIG. 6, it is substantially more economical to introduce the electrical heating wire at a point intermediate the respective ends of the bus bar. In the specific system shown, one end 74 of the heater wire 52 connected to a power source 75 enters the bus bar at an entrance section 76A mounted just inside of the building 70 remote from ends of the bus bar assembly 20A. The other end 77 of the heater wire extends through an end cap 78A of assembly 20A and is inserted in the end cap 78B of the immediately adjacent parallel bus bar assembly 20B. This heater wire segment extends to entrance section 76B, there leaving bus bar assembly 20B and entering bus bar assembly 20C. The heater wire path further comprises the end of bus bar section 20C, thermostat 63, bus bar section 20D, entrance section 76B and the other terminal of power source 75. The series-type connection for the heater wire is one of several which may be employed, as shown and described below.

Heater wire entrance assembly

A preferred embodiment of an entrance section for the heater wire is illustrated in FIGS. 8, 9, 10, 11, 12 and 13. This member comprises a conductive member 90 whose cross-sectional configuration (FIGS. 11, 12) corresponds to the bus bar 24 (FIG. 10). Generally, this member is relatively short, e.g. 6 inches, and includes a bottom lobe 91 enclosing a continuous cavity 92 therethrough corresponding to the cavity formed by the lobe 50 of bus bar 24. An elongated exterior portion of lobe 91 provides a contact surface 93 corresponding to surface 25 of the bus bar 24. An elongated slot 94 is formed in the wall of cavity lobe 91 so that the heater wire 52 may extend from an open end 95 of the cavity 92 through a portion of the cavity and out of elongated slot 94 (FIG. 13).

The entrance member 90 is joined between successive sections of bus bar by the solid connector pin 65 and hollow connector pin 66 described hereinabove. As shown in FIGS. 8 and 9, a first bus bar section 24A includes protruding pins 65A and 66A which are forced into respective cavities of one end of the member 90. Similarly, connector pins 65B and 66B protrude from the opposite end of the member 90 and are forced into respective cavities of the adjoining bus bar section 24B.

An insulating sheath means for covering the entrance member 90 and providing a continuous insulating sheath is formed by a first sheath member 100 and a second sheath member 101.

The first sheath member 100 is somewhat longer than entrance member 90 and has a generally U-shaped cross-section having an inner contour adapted to cover a substantial portion of the entrance member except for a gap 102 which extends along opposite sides of the contact surface 93 (FIGS. 11, 12). Sheath member 100 further includes an open portion 103 spaced from the ends and bottom thereof, leaving end members 104, 105 connected by relatively narrow webs 110 of material along the lower edge thereof. As shown in FIG. 8, when sheath member 100 is applied over the entrance member 90, it provides an insulating covering 104, 105 over the exposed ends of both the entrance member and the adjoining bus bar members and a continuous insulation covering provided by web 110 which lies in intimate contact along opposite sides of the contact surface 93. In addition, the open portion 103 extends below the elongated slot 94 so as to not interfere with the heater wire extending therethrough.

Sheath member 101 is somewhat longer still than sheath member 100 and comprises a generally U-shaped cross-section having a contour adapted to tightly grip the sides of the sheath member 100 and end portions of the bus bar sheath 53, while providing a gap for the exposed contact surface. In order to maintain the sheath member 100 firmly upon the entrance member and bus bar ends, the inner faces of the side walls of the sheath end members 104, 105 extend inwardly at 106, 107 to generally follow the external contour of the bus bar 24 and entrance member 90. Elongated grooves 108, 109 are thus formed in each of the exterior faces of the side walls. Thus, the side walls of sheath member 101 extend inwardly at 111, 112 to engage both the longitudinal grooves 108, 109 of its associated sheath member 100 and the longitudinal grooves 56, 57 of the respective ends of the bus bar sheath 53. Member 101 forms a cavity between its inner surface and the exterior surface of the entrance member 90 through which the heater wire 52 may extend after leaving aperture slot 94. In addition, member 101 includes a small aperture 115 near the top thereof and slightly off-center. The heater wire 52 is inserted into this aperture prior to the sheath member 101 being affixed over the entire entrance section to form the assembly shown in FIG. 8.

It will be apparent that the opening 94 in the entrance member 90 could comprise a small circular aperture instead of slot 94. However, it has been found advantageous to form this opening as a slot since it substantially simplifies passing the heater wire between the cavity opening 95 and out of the opening 94 and, in addition, permits translatory movement of the heater wire within the slot 94 after the entire shielded entrance member has been assembled. Such movement, for example, will result if the system is subjected to temperature changes and the coefficient of expansion of the bus bar is different than the heater wire.

Another advantage of the entrance assembly shown and described hereinabove is that while providing convenient access to the heater cable intermediate the ends of an extending bus bar run, it maintains a uniform exposed contact surface and a continuous insulative covering over the bus bar assembly.

*End cover assembly*

An end cover 78, shown in FIG. 14, is used to insulate the ends of each bus bar run. This cover comprises a substantially closed member having an open end 126 of inside contour corresponding to the external contour of the bus bar assembly 20. A protuberant internal drive pin 127 extends internally opposite the open end 126 for engaging a juxtaposed open end 128 of the upper member 51 of bus bar 24. An aperture 129 in the enclosed end of cover 78 permits the heater wire to extend therefrom for connection to an electrical source of power or adjacent bus bar section as shown in FIG. 6.

*Advantageous method for assembly of heated bus bar with entrance section*

FIG. 13 further illustrates an advantageous method for forming the heated bus bar system having one or more entrance members 90. One end 120 of an extended length of heater wire 52 (illustrated as coil 121) is inserted into opening 95 of entrance section 90, through a portion of the cavity thereof and out of this member via slot 94, and through the interior of sheath 101 and out there of via aperture 115. The other end 122 of the coil 121 of heater wire is extended into the opening of connector pins 66A and threaded through a section of bus bar. When it reaches the other end, the entire length of heater wire is drawn through the section 24A until no slack remains between members 90 and 24A. The pins 65A, 66A are then inserted into the entrance member 90. The shield members 100, 101 are then affixed over the entire entrance member in the manner described above. The remaining length of heater wire is then successively threaded through each section of bus bar as described below.

This mode of assembly illustrates a still further advantage of the slot 94. The heater wire 52 is usually a single, relatively rigid member which would be difficult to thread from the inner cavity of the entrance member 90 if the opening 94 was a circular aperture. However, it is a simple matter to initially form an arcuate curve in the heater wire so that its end will tend to exit the member 90 via the elongated slot 94 when pushed through opening 95.

The entrance assembly shown in FIGS. 8–13 is adapted to provide communication with ends of the heater wire extending in either direction in cavity 91. Thus, another length of heater wire (not shown) may have one end thereof inserted in the opposite end of member 90 and extend through cavity 91 and out slot 94. Such an arrangement allows a very long bus bar run to incorporate plural, individually energized heater wire segments.

The preferred mode for assembling a plurality of successive heated bus bar sections is illustrated in FIG. 17. The section 20A is fixedly mounted by hanger clamps (not shown) and the heater wire 52 threaded out of the end of this section and through the hollow connector pin 66A of the adjacent bus bar section 20B to the opposite end thereof until substantially no slack remains in the heater wire. Section 20B is initially loosely mounted in the hanger clamps 22B so that it may be translated in the left in the figure to join mechanically and electrically section 20A via connector pins 65A, 66A. The clamps 22B are then tightened and the exposed end of the heater wire 52 threaded through the hollow connector pin 66B of succeeding bus bar section 20C as shown, then loosely mounted in hanger clamp 22C. The operation is continued until the requisite number of sections have been mounted.

*Thermostat mounting assembly*

A preferred means for mounting the thermostat 63 is illustrated in FIG. 18. As shown, the thermostat is supported by a generally U-shaped clamp 130 having legs 131, 132 connected at one end by the support surface 133 and having, at their other ends, angularly inwardly directed portions 134, 135. Bolt 140 extending through a threaded aperture in the support surface 133 attaches the thermostat 63 to the clamp 130. A second bolt 137 extends through aligned apertures in the side walls 131, 132 and is provided with a nut 138 whereby the side walls may be drawn together to clamp upon the bus bar 20. These inwardly directed portions are received within the longitudinal grooves 56, 57 in the exterior side walls of the insulating sheath 53.

*Various wiring modes for heated bus bar assemblies*

Representative wiring diagrams for heated bus bar systems constructed in accordance with this invention are illustrated in FIGS. 19a, b and c. In the system of FIG. 19a, three bus bar assemblies 20 each include a heater wire 52 extending through only a portion of the entire length of the bus bar. At one end of each bus bar assembly, the ends of the heater wires are connected together to one side of the secondary winding of transformer 150. The opposite end of each heater wire is connected to the other side of this secondary winding via respective thermostats 63 and circuit breaker 152. As an alternative, a single thermostat may be employed if it has a suitable current capacity or if used in conjunction with a relay. The primary winding of transformer 150 is connected to a source of alternating current 151. Each bus bar 20 is connected in parallel with a power source 153.

An alternative embodiment of a parallel connected system is illustrated in FIG. 19b wherein the plural bus bar assemblies 20 have their respective heater wires 52 connected via a fuse 160 and respective thermostatic elements 63 to a source 161 of direct current.

Circuit breaker 152 and fuse 160 serve to protect their respective power sources 151 and 161 from excessive currents and voltages from power source 153 should a heater wire 52 become shorted to the conductive bus bar upon failure of the heater wire insulation or for any other reason. Thus, in the circuit of FIG. 19a, the circuit breaker 152 will open the circuit to the transformer 150 if excessive currents or voltages are applied to any heater wire 52. Likewise, fuse 160 will burn out before excessive currents and voltages are applied to the direct current source 161.

FIG. 19c illustrates still another circuit for supplying the heater wire power wherein the heater wire 52 of each section are connected in series with a thermostat 63 and the secondary of transformer 150.

Whether a series or parallel connection or combination of both is used will be determined by the system requirements for a given installation and the availability of a suitable step-down transformer 150, preferably with plural taps 154 as shown in FIG. 19a (or rheostat or potentiometer varied current source 161). Alternatively, within limits, the resistance wire may be selected to have certain ohmic resistance per foot. By way of specific example, a suitable resistance wire manufactured and sold by Everwarm, Inc., of Knoxville, Tenn., as described above, is so connected to dissipate on the order of 5 watts per foot. A 160-foot run of heater wire (through a standard bus bar section) has, for example, a total resistance of 70 ohms and will dissipate a total of 682 watts or 4.25 watts per foot when connected to 220 volts A.C. Thus, if the length L of each run of heater wire 52 in the system shown in FIG. 19a is 160 feet, the output at the secondary of transformer 150 should be on the order of 230 volts A.C. For a shorter run of heater wire, the series connection may be preferred. Thus, if each of the sections shown in FIG. 19c have a length L of 60 feet the output of the secondary winding should likewise be 230 volts A.C.

Advantageously, the directional mounting of the bus bars is varied according to the wiring mode selected, i.e. parallel or series circuit. Thus, as shown by arrows 170 in FIG. 19a, the connector pins are directed toward the point where the heater wire enters the bus bar intermediate the respective ends of the bus bar. The heater wire may therefore be first threaded into the connector pin at the start of each section, as described above.

In the parallel connected system schematically shown in FIG. 19b, the connector pins may extend in either direction as shown by arrows 171, 172, the direction in which the heater wire is threaded being preferably opposite the pin direction as described above.

In the series connected system schematically shown in FIG. 19c the pins are advantageously mounted in respectively opposite directions for adjacent bus bar assemblies as shown by arrows 175, 176, 177. In this manner, the continuous heater wire will always first enter the hollow connector pin of each section in a plural array of bus bar assemblies.

Although exemplary embodiments of the invention have been disclosed and discussed, it will be understood that other applications of the invention are possible and that the embodiments disclosed may be subjected to various changes, modifications, and substitutions without necessarily departing from the spirit of the invention.

We claim:
1. A heated trolley electrification system comprising
   a first and second aerially fixedly supported electrically energized bus bar having aligned longitudinal cavities and contact surfaces,
   an electrical resistance heater wire extending through the longitudinal cavity of said first bus bar;
   entrance means for providing external access to said resistance heater wire at a point intermediate the ends of said first and second bus bars including
   a conductive entrance member joined between said first and second bus bars for conducting electrical power between said bars, said conductive member having a longitudinal cavity aligned with the heater wire containing cavity of said first bar, a contact surface aligned with the contact surfaces of said first and second bus bars, and an aperture in the wall of said longitudinal cavity so that said heater wire may extend from the end of said first bus bar through the cavity of said entrance member and out thereof through said aperture; and
   means for joining said conductive entrance member to said first bus bar comprising
   a connector pin inserted into the aligned cavities of said first bus bar and said conductive entrance member, said connector pin having a longitudinally extending aperture through which said resistance heater wire extends between said members without break or splice.

2. The heated trolley electrification system described in claim 1 further comprising
   first and second sheaths including downwardly disposed side walls substantially covering said first and second bus bars respectively leaving exposed said contact surfaces, said sheath having elongated grooves in each of the exterior faces of said side walls;
   and a third sheath including downwardly disposed side walls covering said entrance member leaving exposed its contact surface and end portions of said sheaths covering said first and second bus bars, the sidewalls of said sheath having inwardly extending portions to engage the longitudinal grooves in said first and second sheaths.

3. The heated trolley electrification system described in claim 2 wherein
   said third sheath forms a cavity between its inner surface and the exterior surface of said conductive entrance member through which said heater wire may extend.

4. The heated trolley electrification system described in claim 1 further comprising
   means for providing an insulation covering for the end of said bus bar, said means comprising
   a substantially closed member having an open end of inside contour corresponding to the external contour of said bus bar,
   a protruberant element extending internally opposite said open end for engaging a juxtaposed open end of said bus bar, and
   an aperture through the end opposite said open end through which said heater wire may extend.

5. The heated trolley electrification system described in claim 2 comprising
   a thermostat in series with said electrical resistance wire for connecting same to electrical power at a predetermined temperature and
   means for mounting said thermostat in the environment of said aerially supported bus bar comprising a generally U-shaped clamp having legs connected at one end by a support surface fixed to said thermostat and having respective inwardly directed portions formed at their opposite ends and adapted to engage said longitudinal grooves in said first and second sheaths when said legs are drawn together to clamp said mounting means upon a sheathed bus bar assembly.

6. In a heated trolley electrification system including an aerially fixedly supported, electrically energized bus bar formed of a plurality of hollow bus bar sections disposed in longitudinal alignment, and an electrical resistance heater wire extending through the hollow bus bar sections, the improvement comprising means for joining adjacent sections of said bus bar in fixed alignment including at least a pair of connectors, at least one of which is a connector pin affixed to one end of a given section and adapted for insertion into the adjacent section of bar, said connector pin having a longitudinally extending aperture through which a continuous length electrical resistance heater wire extends between said sections without break or splice.

7. The heated trolley electrification system defined in claim 6, wherein the other one of said connectors is a solid connector pin affixed to the end of said given section in parallel with the apertured pin and adapted for insertion into the adjacent section of bar, said solid connector pin being formed of a conductive material for carrying a substantial current between said sections without current loss and heating at the joint.

8. In a heated trolley electrification system including an aerially fixedly supported, electrically energized bus bar formed of a plurality of longitudinally disposed sections and having a contact surface extending along them for engagement by a current collector, each bus bar section having a composite uniform cross-sectional configuration which includes a substantial portion remote from the contact surface and at least one substantially confined cavity near the contact surface; and a continuous electrically insulated resistance heater wire extending within said cavity, the improvement comprising means for joining sections of the bus bar to maintain physical alignment of their respective contact surfaces to prevent a shearing action between their respective cavities from damaging the heater wire contained therein; and for handling substantial current and voltage without excessive joint heating and current loss, said joining means including at least a pair of connectors, at least one of which is a connector pin aligned with the portion of said bus bar sections remote from said contact surface and adapted for insertion into the corresponding portion of an adjacent section of bar, and another one of which is a connector pin affixed to one end of a given bus bar section in alignment with said confined cavity and adapted for insertion into the corresponding cavity of the adjacent section of bar, said other connector pin having a longitudinally extending aperture through which the continuous electrical resistance heater wire extends.

9. The heated trolley electrification system defined in claim 8 wherein said other connector pin is formed of a current conductive material and thereby contributes to current conduction between said adjacent sections of bus bar.

10. In a heated trolley electrification system including a plurality of sections of aerially fixedly supported, electrically energized bus bar; an insulating sheath substantially covering the bus bar sections, leaving exposed a contact surface; and an electrical resistance heater wire extending through said bus bar; the improvement comprising means for providing external access to said resistance heater wire at a point intermediate the ends of an elongated bus bar assembly including a conductive heater wire entrance member whose cross-sectional configuration corresponds to said bus bar and having means for connecting said member between successive sections of bus bar while maintaining mechanical rigidity and contact surface continuity and alignment, said conductive member having a longitudinal cavity through at least a portion of said member and an elongated slot in the wall of said cavity so that said heater wire may extend from an adjoining bus bar section through one end of said member, said longitudinal cavity, and said slot to the exterior of said bus bar assembly, and an insulating sheath means for covering said heater wire entrance member including a first sheath member of generally U-shaped cross-section having an open portion spaced from the ends and bottom thereof, said open portion extending below said slot in said entrance member when said U-shaped member is affixed over said heater wire entrance member, and a second sheath member of generally U-shaped cross-section, said second member being somewhat longer than said first sheath member and adapted to be fixed over said first member and over the ends of adjacent sheath members so as to form a continuous insulating covering for said bus bar assembly, said second sheath member having an aperture therethrough so that said heater wire may extend through the wall thereof.

11. In a heated trolley electrification system including an aerially fixedly supported, electrically energized bus bar; and an electrical resistance heater wire extending through said bus bar; the improvement comprising cover means for providing insulating covering for the end of said bus bar, said means comprising a substantially closed member having an open end of inside contour corresponding to the external contour of said bus bar, and a protuberant element extending internally opposite said open end for engaging a juxtaposed open end of said bus bar;

said cover means having an aperture through the end opposite said open end through which said heater wire may extend.

12. A trolley electrification system comprising at least two elongated bus bar assemblies aerially fixedly supported parallel one another, each assembly comprising a plurality of heated bus bar sections having longitudinal cavities therethrough, a longitudinally extending heater wire mounted in the cavities proximate said contact surface for heating said surface and thereby inhibiting the formation and retention of frozen moisture thereon when said bus bar is mounted in a relatively cold, humid atmosphere, and at least a pair of connectors affixed to one end of a given bus bar section and including a hollow connector pin adapted for insertion into the adjacent section of bus bar so that said heater wire extends through it between bus bar sections without break or splice, each of said connector pins in each of said bus bar assemblies extending in the same direction.

13. A trolley electrification system comprising at least two elongated bus bar assemblies aerially fixedly supported parallel one another, each assembly comprising a plurality of heated bus bar sections having longitudinal cavities therethrough, a longitudinally extending heater wire mounted in the cavities proximate said contact surface for heating said surface and thereby inhibiting the formation and retention of frozen moisture thereon when said bus bar is mounted in a relatively cold, humid atmosphere, and at least a pair of connectors affixed to one end of a given bus bar section and including a hollow connector pin adapted for insertion into the adjacent section of bus bar so that said heater wire extends through it between bus bar sections without break or splice, said hollow connector pins extending in respectively opposite directions in the adjacent parallel bus bar assemblies.

14. The method of assembling a trolley electrification system comprising a plurality of sections of heated bus bar, each section including an aerially fixedly supported bus bar having an elongated cavity therethrough and an electrical resistance heater wire extending through a series of said cavities in end-to-end relation; and a hollow connector pin affixed to one end of each bus bar section and adapted for insertion into the adjacent section of bar, said method comprising the steps of fixedly mounting a first section of bus bar and extending a length of heater wire out of the open end of its cavity, inserting the extended end of said heater wire into the hollow connector pin of the bus bar section mounted loosely adjacent said first section in end-to-end relation therewith, threading said heater wire entirely through the cavity of said second bus bar section until substantially no slack remains between said sections, and moving said second bus bar in translation so that said hollow connector pin is inserted into the hollow cavity of said first bus bar to retain said bars in juxtaposed abutting relationship with the heater wire extending through both without break or splice.

15. A heated trolley electrification system comprising a plurality of aerially fixedly supported, electrically energized bus bar sections having aligned longitudinal cavities and contact surfaces, an electrical resistance heater wire extending through the longitudinal cavities of said bus bar sections;

entrance means for providing external access to said resistance heater wire at a point intermediate the ends of said bus bar sections including an aperture formed in the wall of one of said bus bar sections in open communication with the longitudinal cavity thereof so that said heater wire may extend from one end of said bus bar through said aperture; and, an insulating sheath mounted in overlying relation to a major part of the bus bar sections to expose only said aligned contact surfaces, said sheath having an aperture therethrough in registration with said aperture in the wall of said bus bar section so that one end of the heater wire may be pulled out of the longitudinal cavities for external connection in a power circuit.

References Cited by the Examiner

UNITED STATES PATENTS

| | | | |
|---|---|---|---|
| 912,901 | 2/1909 | Shafer | 238—14.8 |
| 2,668,199 | 2/1954 | Connel | 191—44.1 X |
| 2,870,311 | 1/1959 | Greenfield et al. | 191—27 X |
| 2,994,734 | 8/1961 | Scofield et al. | 191—44.1 X |
| 3,144,508 | 8/1964 | Howell | 191—23 X |
| 3,189,679 | 6/1965 | Scofield | 191—44.1 X |

FOREIGN PATENTS

| | | |
|---|---|---|
| 543,331 | 2/1942 | Great Britain. |
| 885,765 | 12/1961 | Great Britain. |
| 1,028,607 | 10/1958 | Germany. |

ARTHUR L. LA POINT, *Primary Examiner.*

EUGENE G. BOTZ, *Examiner.*

S. T. KRAWCZEWICZ, *Assistant Examiner.*